Figure 1:
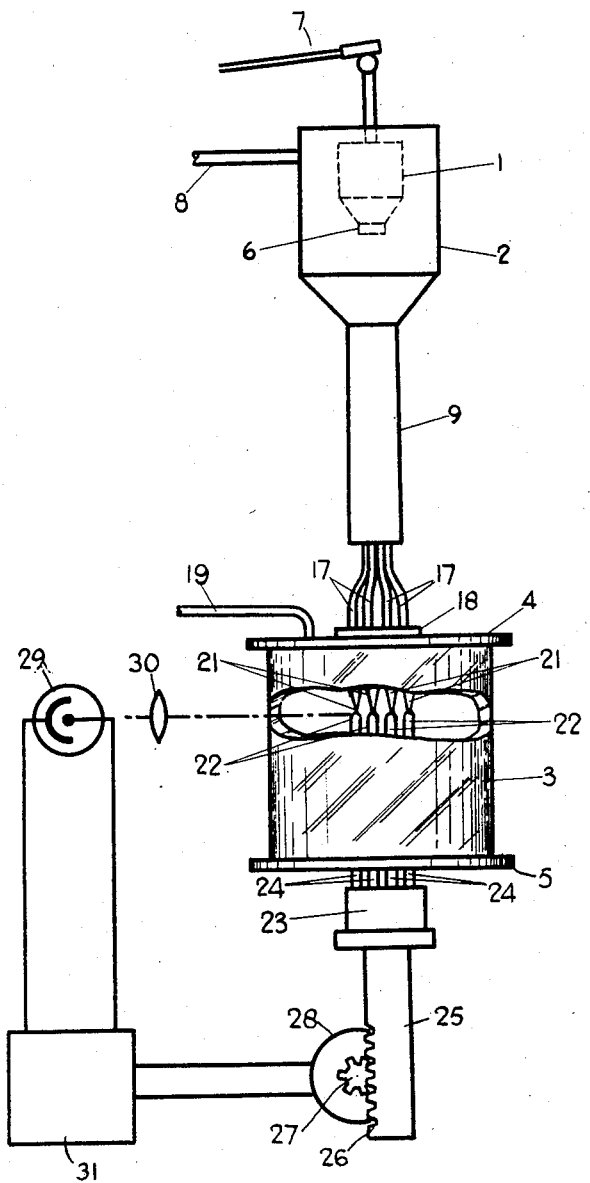

Oct. 26, 1954     L. A. DAUNCEY     2,692,456

APPARATUS FOR MANUFACTURING SYNTHETIC JEWELS

Filed July 8, 1952     2 Sheets—Sheet 1

INVENTOR
LEONARD ARTHUR DAUNCEY

BY
ATTORNEY

Patented Oct. 26, 1954

2,692,456

UNITED STATES PATENT OFFICE

2,692,456

APPARATUS FOR MANUFACTURING SYNTHETIC JEWELS

Leonard Arthur Dauncey, London, England, assignor to The General Electric Company Limited, London, England Application July 8, 1952, Serial No. 297,707

Claims priority, application Great Britain July 13, 1951

2 Claims. (Cl. 49—53)

1

This invention is concerned with apparatus for manufacturing synthetic jewels.

It is known to manufacture synthetic jewels in the form of rods by progressive crystallisation of molten material of which the jewels are constituted. In apparatus which has hitherto been used to manufacture synthetic jewels in this manner only a single rod has been produced at a time.

It is an object of the present invention to provide apparatus for manufacturing synthetic jewels in the manner described above in which two or more rods may be produced simultaneously, thereby facilitating an increased rate of production of synthetic jewels without incurring a proportional increase in the capital expenditure required.

According to the invention, apparatus for manufacturing synthetic jewels comprises in combination means for passing through a primary duct a stream of gas carrying the constituent material of the jewels in powder form, a distributor for splitting up the stream of gas issuing from the primary duct so that it passes through at least two secondary ducts leading into a furnace chamber, the mean rates of flow of the gas and the powder through the secondary ducts being substantially the same for all the secondary ducts, means for fusing the constituent material issuing from the secondary ducts in the furnace chamber by a combustion process involving the gas issuing from the secondary ducts, a support member on which can be built up by progressive crystallisation of the molten constituent material a number (equal to the number of secondary ducts) of jewels in the form of rods which extend substantially vertically, and means for causing relative vertical movement between the support member and the openings of the secondary ducts into the furnace chamber as the rods are built up so as to maintain a substantially constant distance between the tips of the rods and the openings of the secondary ducts into the furnace chamber.

The distributor may comprise a first passage of annular cross-section disposed around the primary duct and a second passage of annular cross-section disposed around the first passage, the gas being arranged to flow from the primary duct through the first and second passages respectively to the secondary ducts so that the direction of flow of the gas is reversed as it passes from the primary duct to the first passage and as it passes from the first passage to the second passage.

2

Figure 2:
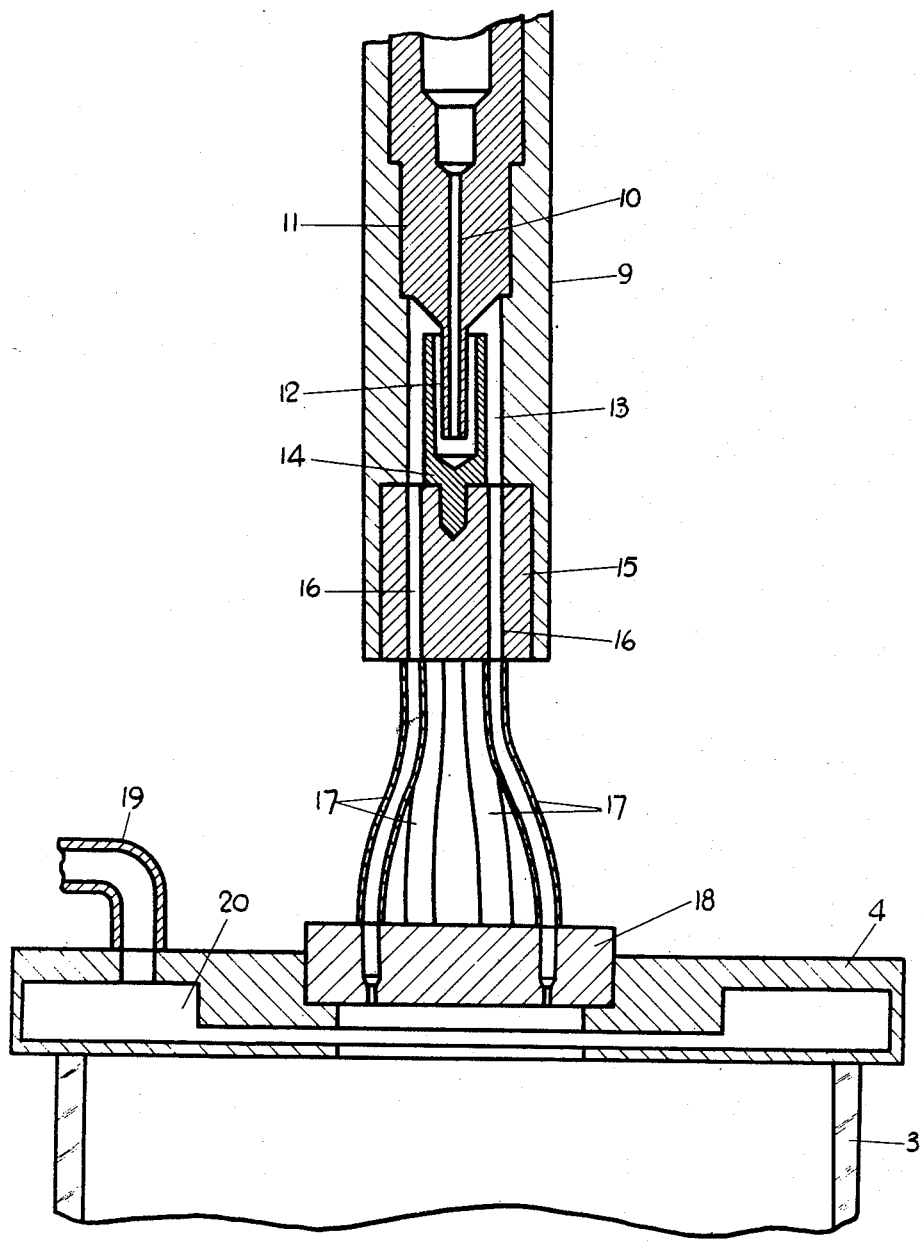

One arrangement in accordance with the invention will now be described, by way of example, with reference to the accompanying drawings, in which:

Figure 1 is a diagrammatic view of apparatus for manufacturing simultaneously six rods of synthetic corundum; and Figure 2 is a sectional view of the distributor and the top of the furnace chamber forming part of the apparatus shown in Figure 1.

Referring now to Figure 1 of the drawings, the raw material for the manufacture is in the form of alumina powder and is disposed in a container 1 in a powder dispenser 2 mounted above a furnace chamber which is formed by a hollow glass cylinder 3 mounted between two metal plates 4 and 5. The container 1 is provided at the bottom with a fine sieve 6 and a hammer mechanism 7 is provided for intermittently striking the container 1 so that powder is released. An oxygen supply is connected via a pipe 8 to the interior of the dispenser 2 and the powder released from the container 1 is carried by the oxygen flow into a primary duct extending downwards in the interior of a tubular member 9 disposed between the dispenser 2 and the furnace chamber. The oxygen and alumina powder pass from the primary duct into a distributor, disposed inside the tubular member 9, which splits up the flow into six secondary ducts which lead into the top of the furnace chamber.

The distributor is shown in detail in Figure 2, to which reference should now be made. The primary duct 10 extends axially through a cylindrical member 11 which is mounted inside the tubular member 9. The distributor includes a first passage 12 of annular cross-section surrounding the primary duct 10, and a second passage 13 of annular cross-section surrounding the first passage 12. The passage 12 is formed by two cylindrical surfaces, the inner one of which is formed on the end of the member 11 and the outer one of which is formed inside a cylindrical member 14 which is supported by a cylindrical member 15 mounted inside the tubular member 9. The passage 13 is formed by the outer surface of the member 14 and the inner surface of the member 9. The six secondary ducts 16 lead off from the end of the second passage 13, and it will be seen that the oxygen and alumina powder flow from the primary duct 10 through the passages 12 and 13 respectively to the secondary ducts 16, the direction of flow being reversed as the oxygen and alumina powder pass from the primary duct 10 to the passage 12 and as they pass from the passage 12 to the passage 13.

The six secondary ducts 16 are arranged in radially symmetrical fashion and pass through the member 15, through tubes 17, and through a cylindrical member 18 mounted on the top plate 4 of the furnace chamber, the secondary ducts 16 directing the flow of oxygen and alumina powder vertically downwards as they enter the furnace chamber. A separate hydrogen supply is connected to the furnace chamber via a pipe 19, the hydrogen being arranged to flow into the furnace chamber through a toroidal cavity 20 in the plate 4.

Combustion is caused to take place in the furnace chamber, six flames 21 being formed at the openings of the secondary ducts 16 into the chamber. The alumina powder issuing from the secondary ducts 16 is thus fused, and the molten material is arranged to be built up by progressive crystallisation into six vertically extending rods 22 of synthetic corundum. For this purpose there is provided a support member 23 which includes six ceramic rods 24 which extend vertically through an aperture in the base plate 5 of the furnace chamber. The six rods 24 are arranged in radially symmetrical fashion below the openings of the secondary ducts 16 into the furnace chamber, so that one of the six rods 22 of synthetic corundum is built up on the top of each of the six ceramic rods 24.

In order to ensure uniformity of the cross-section and quality of the rods 22 of synthetic corundum it is necessary to move them vertically downwards as they are built up so as to maintain a substantially constant distance between the tips of the rods 22 and the openings of the secondary ducts 16 into the furnace chamber. For this purpose the support member 23 is mounted on a vertically extending rod 25 which is provided with a rack of teeth 26 cooperating with a pinion wheel 27 which is arranged to be driven by means of an electric motor 28. The motor 28 is controlled by means of a photo-electric control apparatus such as is described in British patent specification No. 633,118, this apparatus including a photo-electric cell 29 on to which light from the incandescent tip of one of the rods 22 of synthetic corundum is focussed by means of a lens 30. The output of the photo-electric cell 29 is fed to an amplifier and relay circuit 31 which controls the operation of the motor 28 in such a manner that the support member 23 is moved vertically downwards at the required rate. It will be appreciated that the photo-electric control apparatus is responsive to the growth of only one of the rods 22, but the use of the distributor described above ensures that all the six rods 22 will be built up uniformly.

I claim:

1. Apparatus for manufacturing synthetic jewels, comprising members defining a furnace chamber, a primary duct, and at least two secondary ducts leading vertically into the furnace chamber, means for passing through the primary duct a stream of a first gas carrying the constituent material of the jewels in powder form, a distributor for splitting up the stream of gas issuing from the primary duct so that it passes through the secondary ducts with the mean rates of flow of the gas and the powder through the secondary ducts being substantially the same for all the secondary ducts, means for introducing into the furnace chamber a flow of a second gas adapted to undergo combustion with said first gas to bring about fusion of the constituent material issuing from the secondary ducts into the furnace chamber, the openings of the secondary ducts into the furnace chamber being spaced apart sufficiently to ensure that during combustion entirely separate flames are formed at each of said openings, a support member on which can be built up by progressive crystallisation of the molten constituent material a number (equal to the number of secondary ducts) of jewels in the form of rods which extend substantially vertically, and means for causing relative vertical movement between the support member and the openings of the secondary ducts into the furnace chamber as the rods are built up so as to maintain a substantially constant distance between the tips of the rods and the openings of the secondary ducts into the furnace chamber.

2. Apparatus according to claim 1, in which the distributor comprises members defining a first passage of annular cross-section disposed around the primary duct and a second passage of annular cross-section disposed around the first passage and communicating with the secondary ducts, said members being shaped to guide the flow of gas from the primary duct into the first passage with reversal of the direction of flow of the gas and to guide the flow of gas from the first passage into the second passage with reversal of the direction of flow of the gas.

References Cited in the file of this patent

UNITED STATES PATENTS

| Number | Name | Date |
|---|---|---|
| 365,606 | Kline | June 28, 1887 |
| 1,960,215 | Ellis et al. | May 22, 1934 |
| 2,011,872 | Rava | Aug. 20, 1935 |
| 2,518,543 | Hasse | Aug. 15, 1950 |
| 2,591,561 | Lester et al. | Apr. 1, 1952 |

FOREIGN PATENTS

| Number | Country | Date |
|---|---|---|
| 633,118 | Great Britain | Dec. 12, 1949 |